(12) United States Patent
Chini et al.

(10) Patent No.: US 7,215,715 B2
(45) Date of Patent: May 8, 2007

(54) SYSTEM AND METHOD OF SIGNAL WAVE SHAPING FOR SPECTRUM CONTROL OF AN OFDM SIGNAL

(75) Inventors: Ahmad Chini, Ontario (CA); Hossein Alavi, Ontario (CA); Mohammad Reza Movahedin, Dubai (AE)

(73) Assignee: Maxim Integrated Products, Inc., Sunnyvale, CA (US)

( * ) Notice: Subject to any disclaimer, the term of this patent is extended or adjusted under 35 U.S.C. 154(b) by 881 days.

(21) Appl. No.: 09/900,087

(22) Filed: Jul. 6, 2001

(65) Prior Publication Data

US 2002/0105901 A1   Aug. 8, 2002

Related U.S. Application Data

(60) Provisional application No. 60/266,803, filed on Feb. 6, 2001.

(51) Int. Cl.
*H04K 1/02* (2006.01)
*H04K 1/10* (2006.01)

(52) U.S. Cl. .................................. 375/296

(58) Field of Classification Search ............. 375/260, 375/296; 370/208, 343
See application file for complete search history.

(56) References Cited

U.S. PATENT DOCUMENTS

| | | | | |
|---|---|---|---|---|
| 5,170,413 A | * | 12/1992 | Hess et al. ............. | 375/260 |
| 5,675,572 A | | 10/1997 | Hidejima et al. | |
| 6,088,398 A | * | 7/2000 | Wahlqvist et al. ......... | 375/260 |
| 6,130,918 A | * | 10/2000 | Humphrey et al. ......... | 375/295 |
| 6,167,237 A | * | 12/2000 | Rapeli ..................... | 455/63.1 |
| 6,438,367 B1 | * | 8/2002 | Crawford .................. | 455/410 |

(Continued)

FOREIGN PATENT DOCUMENTS

EP     0814587     12/1997

(Continued)

OTHER PUBLICATIONS

Byeong-Gwon Kang, et al.; "On the Performance of an OFDM/CDMA System under Realistic Channel Conditions"; 1997 IEEE 6th. Int. Conference on Unviersal Personal Communuations Record. San Diego, Oct. 12-16, 1997, IEEE.

(Continued)

*Primary Examiner*—Kevin Kim
(74) *Attorney, Agent, or Firm*—Blakely Sokoloff Taylor & Zafman LLP

(57) ABSTRACT

A system and method of controlling the spectrum of an orthogonal frequency division multiplexing (OFDM) signal. The method comprises receiving an input frame of data samples to be modulated onto orthogonal multi-carrier signals, performing frequency domain filtering and spectrum masking on the input frame of data samples, and modulating the respective frequency modified data samples onto a plurality of carriers. Such a system may include an over sampling logic to over sample the input data to increase the frequency resolution of the output spectrum, a wave shaping filter to perform frequency domain filtering of the input data, a spectrum mask to further modify the spectrum of the output signal, and an inverse fast Fourier transform (IFFT) to generate the modulated orthogonal multi-carrier signal. Another embodiment entails controlling the spectrum of the output OFDM signal by performing time-domain filtering.

8 Claims, 4 Drawing Sheets

U.S. PATENT DOCUMENTS 6,751,267 B1 * 6/2004 Schill et al. ................. 375/296
6,891,792 B1 * 5/2005 Cimini et al. ............... 370/206

FOREIGN PATENT DOCUMENTS

GB        2296165        6/1996

WO        WO 99/62214        12/1999

OTHER PUBLICATIONS

Nikookar H. et al., "Frequency offset sensitivity reduction of multicarrier transmission by waveshaping", International Conference on Personal Wireless Communications, 2000 pp. 444-448.

* cited by examiner

SYSTEM AND METHOD OF SIGNAL WAVE SHAPING FOR SPECTRUM CONTROL OF AN OFDM SIGNAL

CROSS REFERENCE TO RELATED APPLICATIONS

This patent application claims the benefit of the filing date of Provisional Patent Application, Ser. No. 60/266,803, filed on Feb. 6, 2001, entitled "OFDM Spectrum Shaping Technique", which is incorporated herein by reference.

FIELD OF THE INVENTION

This invention generally relates to the field of communications. In particular, this invention relates to a system and method of signal wave shaping for spectrum control of an orthogonal frequency division multiplexing (OFDM) signal.

BACKGROUND OF THE INVENTION

For many years, a number of modulation techniques have been used to transfer data from a source to a destination. One class of modulation technique is referred to as multi-carrier modulation (MCM). In accordance with multi-carrier modulation (MCM), data is transmitted in parallel by way of a plurality of carriers. In a multi-carrier modulation (MCM) system, data is first organized in frames for transmission in parallel via the plurality of carriers. Then, the framed data is modulated onto respective carriers for transmission. Examples of multi-carrier modulation (MCM) include frequency division multiplexing (FDM), orthogonal frequency division multiplexing (OFDM), and multi-carrier code-division multiple access (CDMA).

Of particular interest to the invention is the orthogonal frequency division multiplexing (OFDM). However, although orthogonal frequency division multiplexing (OFDM) will serve to illustrate the invention, it shall be understood that the principles of the invention can be applied to other multi-carrier modulation systems, such as frequency division multiplexing (FDM) and multi-carrier code-division multiple access (CDMA). In an orthogonal frequency division multiplexing (OFDM) system, a frame of data is applied to an Inverse Fast Fourier Transform (IFFT). The Inverse Fast Fourier Transform (IFFT) modulates the framed data to respective carriers.

An advantage of orthogonal frequency division multiplexing (OFDM) stems from the fact that adjacent carriers overlap in frequency and the carriers are orthogonal with respective to each other. The overlapping of adjacent carriers is advantageous because more carriers can be used within a given bandwidth, and therefore the data throughput is generally higher within the given bandwidth. The orthogonality of the carriers is advantageous because it reduces inter carrier interference (ICI). That is, because in an orthogonal system a carrier's frequency response is at approximately zero amplitude at the maximum amplitude of all other carriers, the likelihood of interference between carriers is reduced.

Since the carriers of an orthogonal frequency division multiplexing (OFDM) system are adjacent and overlap, the carriers as a whole occupy a continuous bandwidth. Often, this continuous bandwidth has to be shared with one or more other communications systems. Thus, these other one or more communications systems occupy a portion of the continuous bandwidth of an orthogonal frequency division multiplexing (OFDM) signal. Therefore, it is often desirable to shape the frequency spectrum of an orthogonal frequency division multiplexing (OFDM) signal so that it does not affect the operation of the other one or more communications systems occupying the same continuous bandwidth.

Thus, there is a need for a system and method of signal wave shaping for spectrum control of an orthogonal frequency division multiplexing (OFDM) signal to prevent interference with other communication systems that occupy the same bandwidth, as well as perform other desired functions. There is also a further need for a system and method of signal wave shaping for spectrum control of an orthogonal frequency division multiplexing (OFDM) that is adaptive (i.e. programmable) in order to change its frequency response to compensate for change in the bandwidth environment and also to make the system versatile. Such a system and method are described herein in accordance with the invention.

SUMMARY OF THE INVENTION

An aspect of the invention relates to a method of controlling the spectrum of a modulated multi-carrier signal. In its general form, the method comprises receiving an input frame of data samples to be modulated onto multi-carrier signals, performing frequency domain modification on the input frame of data samples, and modulating the respective frequency modified data samples onto a plurality of carriers. Performing the frequency domain modification on the input frame of data samples is done to achieve a desired spectrum for the output modulated multi-carrier signal. An advantage of a system employing the spectrum control methodology of the invention is that it allows for the programmability and adaptability the frequency spectrum of the output multi-carrier signal. Thus, a single system design can be programmed to produce many different spectrums for different applications. Another advantage is reduced implementation complexity for some applications compared to other methods of spectrum shaping.

Another aspect of the invention relates to an orthogonal frequency division multiplexing (OFDM) communications system. The OFDM system comprises an over sampling logic to generate an MN over sampled data frame from an N sample data frame, wherein the MN over sampled data frame comprises M-1 zeros between adjacent data samples; a wave shaping filter to perform a circular convolution of the over sampled data frame with MN filter coefficients to produce an MN complex filtered sample frame in order to modify the spectrum (frequency response) of the modulated orthogonal multi-carrier signal; a spectrum mask to modify the MN complex filtered sample frame respectively by MN mask elements to produce an MN complex filtered and masked sample frame in order to further modify the spectrum of the modulated orthogonal multi-carrier; and an inverse fast Fourier transform (IFFT) to generate the modulated orthogonal multi-carrier signal from the MN complex filtered and masked sample frame.

Yet another aspect of the invention relates to another method of controlling the spectrum of a modulated multi-carrier signal. In its general form, the method comprises receiving an input frame of data samples to be modulated onto the multi-carrier signal, modulating the data samples onto a plurality of carrier signals, and performing time domain modification of the carrier signals to form the modulated multi-carrier signal. Performing the time domain modification on the carrier signals is done to achieve a desired spectrum for the output modulated multi-carrier signals. An advantage of a system employing the spectrum control methodology of the invention is that it allows for the programmability and adaptability the frequency spectrum of the output multi-carrier signal. Thus, a single system design can be programmed to produce many different spectrums for different applications.

Still another aspect of the invention relates to an orthogonal frequency division multiplexing (OFDM) communications system. The OFDM system comprises an inverse fast Fourier transform (IFFT) to generate N modulated orthogonal carrier signals from an N-sample data frame, an M time cyclic extension to increase the frequency resolution of respective N modulated orthogonal carrier signals by a factor of M; and an MN point time-domain filter to modify the frequency response of the higher time resolution, modulated orthogonal carrier signals to form the modulated and filtered orthogonal multi-carrier signal.

Other aspects, features and techniques of the invention will become apparent to one skilled in the relevant art in view of the following detailed description of the invention.

DETAILED DESCRIPTION OF THE INVENTION

Figure 1:
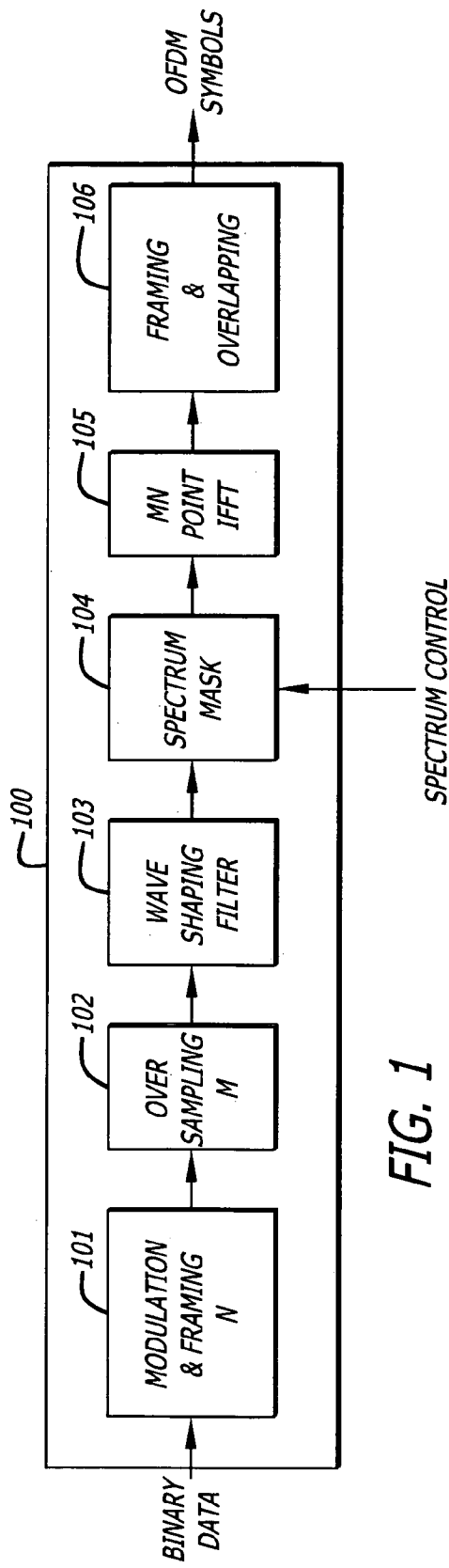
FIG. 1 illustrates a block diagram of an exemplary orthogonal frequency division multiplexing (OFDM) system in accordance with the invention.

FIG. 1 illustrates a block diagram of an exemplary orthogonal frequency division multiplexing (OFDM) system 100 in accordance with the invention. The OFDM system 100 of the invention provides for control and programmability of the frequency spectrum of the OFDM signal generated. The OFDM system 100 comprises a modulation and framing logic 101, an over sampling logic 102, a wave shaping filter 103, a spectrum mask 104, an inverse Fast Fourier Transform (IFFT) 105, and a framing and overlapping logic 106. The OFDM system 100 accepts a spectrum control instruction to generate the desired spectrum of the output OFDM signal.

The OFDM system 100 receives as an input binary data. The input data is sent to the modulation and framing logic 101. This block modulates the binary input data to generate real or complex-valued data, typically referred to in the art as "constellations". The modulated data are framed in blocks of size N. The modulation and framing logic 101 may also include Hermitian extension logic for baseband applications. The Hermitian extension logic adds N/2 conjugate mirror samples to N/2 modulated data samples and forms a data frame of length N. The reason for the Hermitian extension is that for baseband transmission applications, the output of the IFFT 105 should be real-valued data.

The modulation of the binary input data can be of many types. For example, the modulation can be phase shift keying (PSK), amplitude shift keying (ASK), quadrature amplitude modulation (QAM) or other derivatives of these modulation schemes, such as binary phase shift keying (BPSK), quadrature phase shift keying (QPSK) and 64QAM, to name a few. The particular type of modulation applied to the binary input data is not critical to the invention.

After the binary input data has been modulated and framed in frames of length N, it is sent to the over sampling logic 102. The over sampling logic 102 inserts an integer number M-1 of logic zeros in between consecutive data samples. The purpose of the over sampling of the modulated data is to increase the frequency resolution of the data in order to allow better control the spectrum of the OFDM signal generated by the OFDM system 100. This forms a newly created frame of length MN.

If the OFDM system 100 did not include any over sampling, the frequency resolution of the OFDM signal would be proportional to the given bandwidth divided by the frame length N in this case. With over sampling, the frequency resolution would be proportional to the given bandwidth divided by the frame length MN, which is a factor of M greater. The greater frequency resolution gives the OFDM system 100 more accuracy in controlling the spectrum of the output OFDM signal.

After the input data is over sampled by the over sampling logic 102, the over sampled data is sent to the wave shaping filter 103. The first part of the spectrum control of the invention takes place in the wave-shaping filter 103. The wave-shaping filter 103 performs desired spectrum shaping of one or more sub-carriers that end up as part of the output OFDM signal of the OFDM system 100. As is explained later in more detail, not all of the potential sub-carriers generated by the IFFT 105 are generated because the spectrum mask 104 may be used to suppress one or more of the sub-carriers or their side-lobes. The wave-shaping filter 103 will be initially used to alter the side lobes associated with respective sub-carriers that end up as part of the output OFDM signal.

Figure 2:
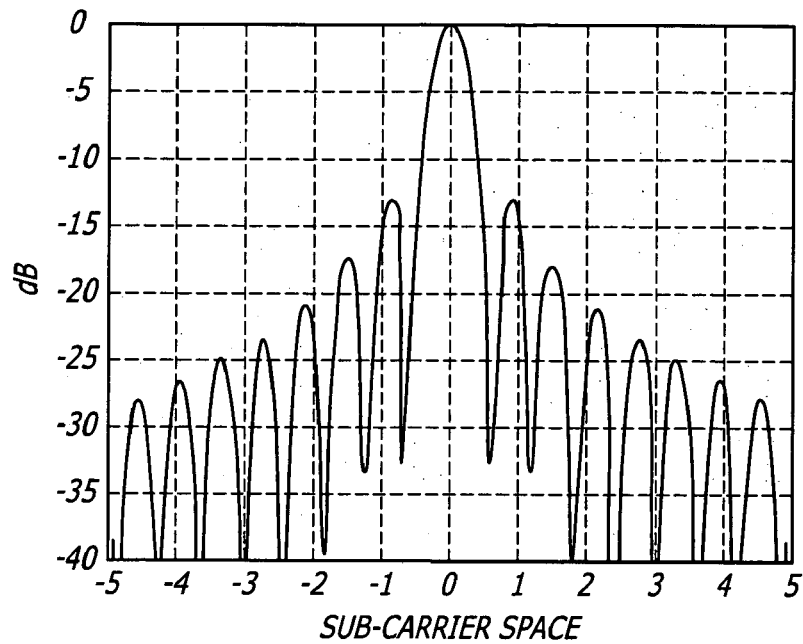
FIG. 2 illustrates a graph of the frequency response of an OFDM sub-carrier that has not been modified by a wave-shaping filter.

For example, FIG. 2 illustrates a graph of the frequency response of an original OFDM sub-carrier (i.e. one that has not been modified by the wave shaping filter 103). This frequency response illustrates that the power level of the side lobes associated with the OFDM sub-carrier are relatively high. For example, the power level of the third side lobe is only about 21 dB below that of the sub-carrier with the power level of the seventh side lobe being only 28 dB below that of the sub-carrier. In some cases, it may be desirable to reduce the power level relative to the sub-carrier of one or more side lobes to prevent interference with one or more other communication applications occupying a portion of the continuous bandwidth of the OFDM system 100. Thus, the wave-shaping filter 103 can be used to suppress some of the side lobes associated with the sub-carrier.

Figure 3:
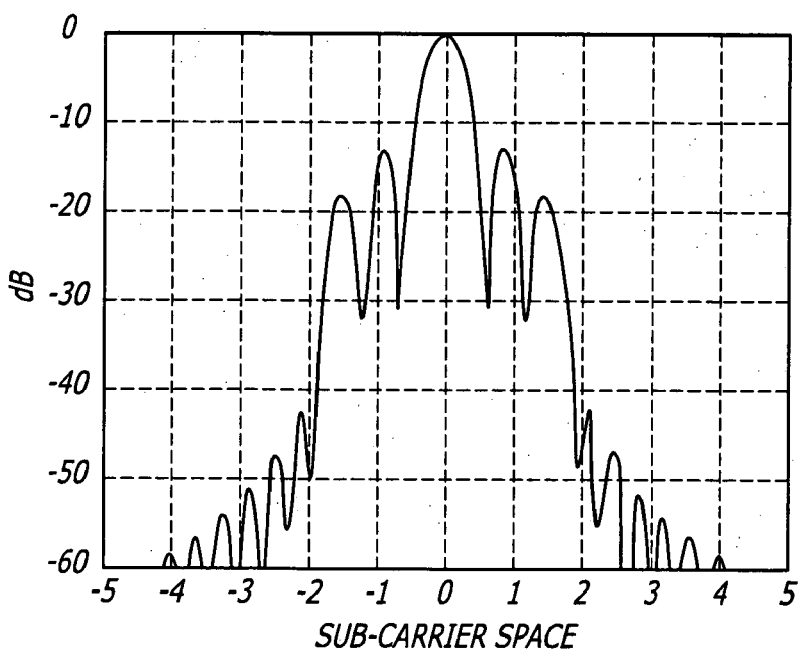
FIG. 3 illustrates a graph of the frequency response of an OFDM sub-carrier that has been modified by a wave-shaping filter in accordance with the invention.

FIG. 3 illustrates a graph of an exemplary frequency response of an OFDM sub-carrier that has been symmetrically modified by the wave-shaping filter 103 in accordance with the invention. This exemplary frequency response illustrates that the power levels of some of the side lobes associated with the OFDM sub-carrier may be desirably reduced by the wave-shaping filter 103. In this example, the power level of the third side lobe has been reduced to about 43 dB below that of the sub-carrier with the power level of the seventh side-lobe being reduced to 60 dB below that of the sub-carrier. This is substantially lower than the power levels of the third and seventh side lobes of the original OFDM sub-carrier. Additionally, the wave-shaping filter 103 need not modify the frequency response of the original OFDM sub-carrier in a symmetrical manner.

Figure 4:
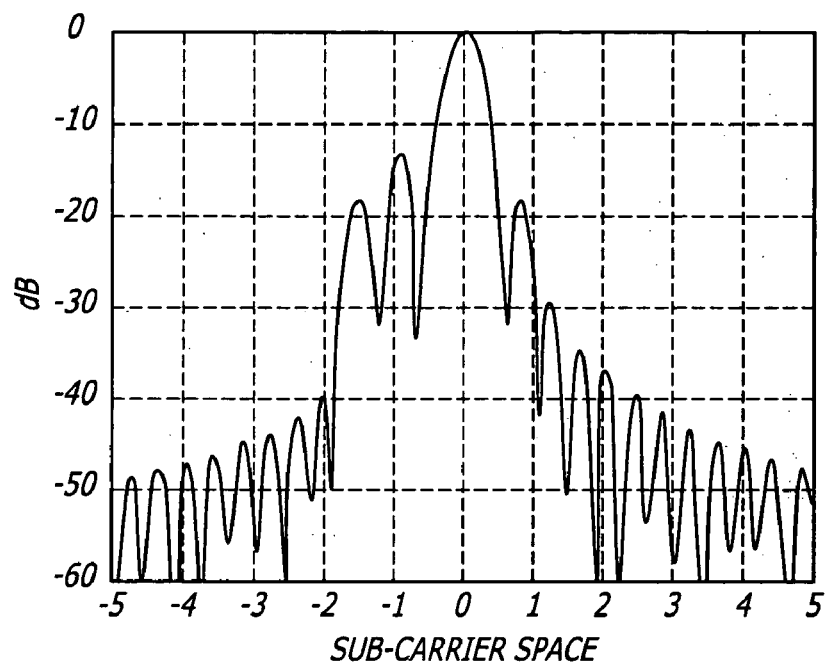
FIG. 4 illustrate a graph of an exemplary frequency response of an OFDM sub-carrier that has been asymmetrically modified by the wave shaping mask in accordance with the invention.

FIG. 4 illustrates a graph of an exemplary frequency response of an OFDM sub-carrier that has been asymmetrically modified by the wave-shaping filter 103 and the spectrum mask 104 in accordance with the invention. This exemplary frequency response illustrates that the power levels of the side lobes may be modified asymmetrically about the corresponding OFDM sub-carrier. In this example, the power levels of the first and second side lobes on the lower frequency side of the sub-carrier are about 14 dB and 19 dB below the power level of the sub-carrier. Whereas the power levels of the first and second side lobes on the upper frequency side of the sub-carrier are about 19 dB and 30 dB below the power level of the sub-carrier. Asymmetrical sub-carrier frequency response may be desired when the potential interference may occur only on a particular frequency side of a sub-carrier.

In the exemplary embodiment, the wave-shaping filter 103 may be configured as a finite impulse response (FIR) filter. If such is the case, a vector of up to MN complex valued samples represents the FIR filter response. The output of the FIR filter is the circular convolution of the MN input samples and the MN filter coefficient. The filter output is therefore MN complex samples. The impulse response of the wave-shaping filter 103 is the MN point FFT of a (L+N) size window, where L is the length of the required cyclic prefix. In OFDM applications, the window is usually chosen to be rectangular with raised cosine (or sometimes sharp) edges. Since the impulse response of the wave shaping filter 103 approaches small values towards the ends, it may be truncated to reduce the side lobes and implementation complexity, with negligible effects on the sub-carrier orthogonality preservation.

Referring again to FIG. 1, after the input data has undergone filtering by the wave-shaping filter 103, the input data is sent to the spectrum mask 104. The second part of the frequency spectrum control of the invention takes place in the spectrum mask 104. The spectrum mask 104 is used to modify the respective power levels of the sub-carriers and their side lobes generated by the IFFT 105. Thus, in addition to shaping of the sub-carriers spectrum provided by the wave-shaping filter 103, certain sub-carriers or their side lobes can be reduced in power or even substantially eliminated from the output OFDM signal spectrum. For example, one or more adjacent sub-carriers may be substantially eliminated to free up some bandwidth within the continuous OFDM bandwidth for other communication applications.

In the exemplary implementation, the spectrum mask 104 comprises a vector of length MN with elements equal to a scaling factor. The filtered input data generated by the wave-shaping filter 103 is multiplied respectively by the vector elements of the spectrum mask 104. The spectrum of the output OFDM signal can be controlled by proper selection of the vector elements of the spectrum mask 104. Typically, for lower complexity, the scaling factors will be ones or zeros, but need not be limited to those. If the scaling factor is set to one, the corresponding sub-carrier or side lobe will be present in the output OFDM signal. If the scaling factor is set to zero, the corresponding sub-carrier or side lobe will be substantially eliminated in the output OFDM signal. As such, the spectrum mask vector elements should be set to ones for sub-carriers and side lobes forming the pass-band of the OFDM spectrum, whereas the vector elements should be set to zeros to eliminate sub-carriers or side lobes corresponding to the stop band of the OFDM spectrum. Scaling factors not being ones or zeros just affect the power levels of the corresponding sub-carriers or side lobes.

Figure 5:
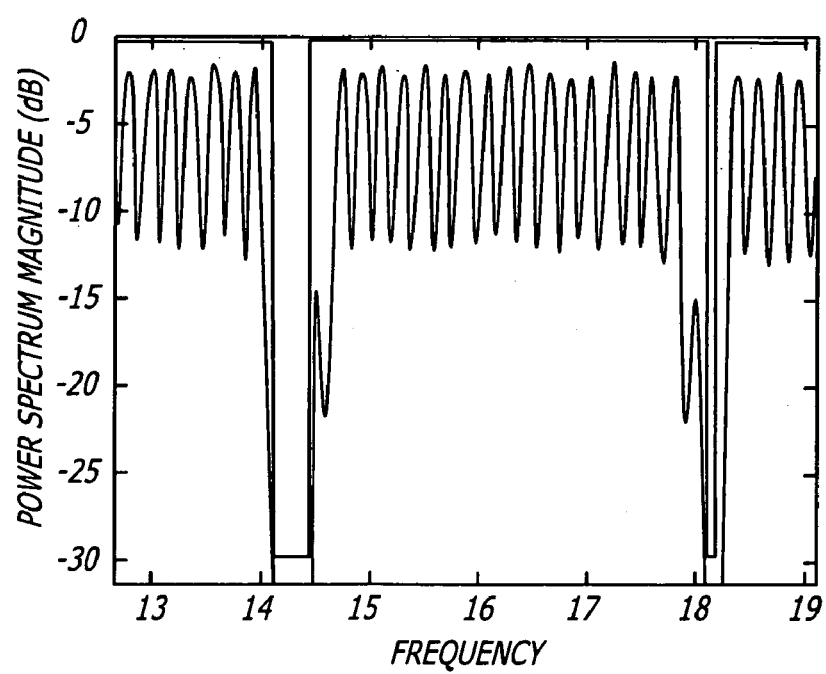
FIG. 5 illustrates a graph of an exemplary frequency response of an OFDM signal spectrum that has been modified by the wave shaping filter and the spectrum mask in accordance with the invention.

FIG. 5 illustrates a graph of an exemplary frequency response of an OFDM signal spectrum that has been modified by the spectrum mask 104 in accordance with the invention. As the graph illustrates, three adjacent sub-carriers near the frequency 14 and another two sub-carriers near the frequency 18 have been substantially eliminated using the spectrum mask 104 of the invention. Thus, the spectrum mask 104 can be used to substantially eliminate one or more sub-carriers or side lobes to prevent interference with other applications sharing the OFDM bandwidth or for other desired functions.

Referring once again to FIG. 1, after the filtered input data has undergone the spectrum shaping by the spectrum mask 104, the input data is sent to the Inverse Fast Fourier Transform (IFFT) 105. The IFFT 105 generates the orthogonal sub-carriers and modulates the input data onto the respective sub-carriers. If the input data frame applied to the IFFT 105 has a length of MN, then the output of the IFFT 105 comprises MN point time domain coefficients. The MN point time domain coefficients represent respectively the modulated OFDM sub-carrier signals in the time-domain.

The MN point time domain OFDM signal is then sent to the framing and overlapping logic 106. The framing and overlapping logic 106 truncates, frames and overlaps the MN point time domain OFDM signal to generate the OFDM symbols. The truncation and framing size may be defined with the variable S, which is less than MN and is larger than (L+N). The OFDM symbol frames are, therefore, overlapped by S−(L+N) samples to generate the OFDM symbols of length (L+N). The wave shaping filter truncation length, the post IFFT frame size S, and the over sampling rate M depend on the spectrum requirements and can be obtained by mathematical analysis and/or computer simulations. The design criteria are usually the required transmit signal spectrum, constellation accuracy per sub-carrier, and implementation complexity. The combination of the over sampling logic 102 and the wave-shaping filter 103 may be modeled as a state machine which can be implemented using a table lookup method.

An advantage of the OFDM system 100 in accordance with the invention is that it lends itself to programmability and adaptability of the spectrum of the output OFDM signal. In this regard, the OFDM system 100 accepts the spectrum control instruction and applies a proper spectrum mask to achieve the desired spectrum. This spectrum control input can be user generated or generated by a spectrum controlling system, such as for example, one that compensates for adverse changes in the transmission medium. Thus, the OFDM system 100 can be configured as a single design, but programmed for any number of different applications or situations.

Figure 6:
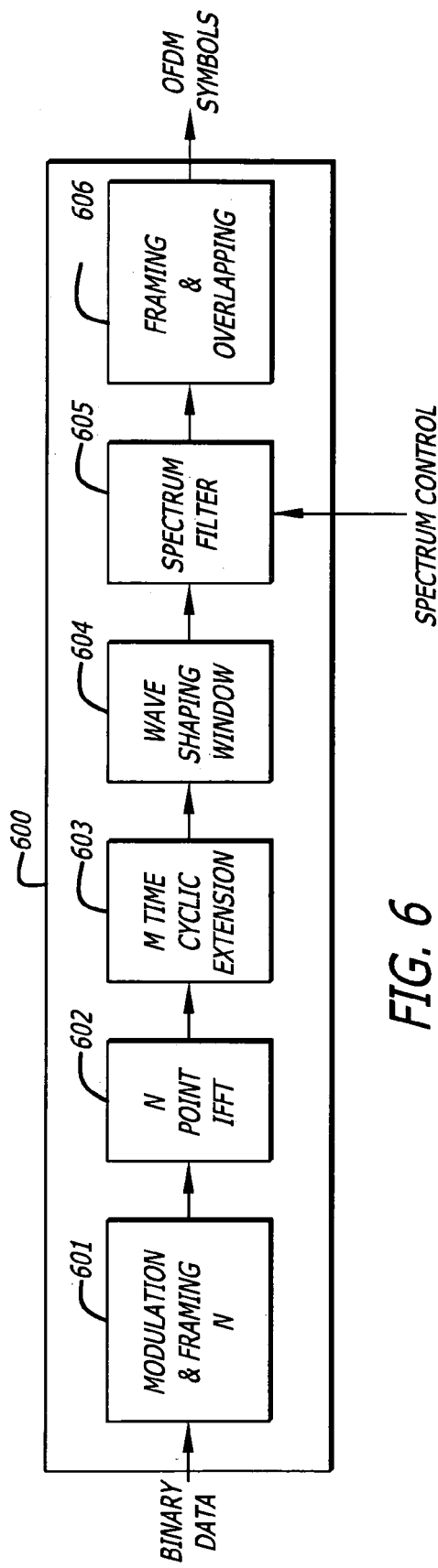
FIG. 6 illustrates a block diagram of another exemplary orthogonal frequency division multiplexing (OFDM) system in accordance with the invention.

FIG. 6 illustrates a block diagram of an alternative implementation of OFDM system 100 in accordance with the invention. Similar to the OFDM system 100, the OFDM system 600 also provides for control and programmability of the frequency spectrum of the output OFDM signal. The OFDM system 600 comprises a modulation and framing logic 601, an N-point IFFT 602, an M time cyclic extension 603, an MN point wave shaping window 604, an MN point spectrum filter 605, and a framing and overlapping logic 606. Block numbers 101 and 106 in the OFDM system 100 are the same as block numbers 601 and 606 in the OFDM system 600.

In operation, the input binary data are sent to the modulation and framing logic 601 and are modulated and organized in frames of length N. Then the modulated data is applied to the N point IFFT 602 to generate the orthogonal sub-carriers and to modulate the input data onto respective sub-carriers. If the input data frame applied to the IFFT 602 has a length of N, then the output of the IFFT 602 comprises N point time domain coefficients. The N point time domain coefficients represent respectively the original OFDM sub-carrier signals in the time domain.

The OFDM time domain signal is then sent to the M time cyclic extension 603. This effectively increases the frequency resolution of the signal by a factor of M. The extended signal is then weighted by the MN point waveshaping window 604 and sent to the MN point spectrum filter 605. The filter 605 then performs the final spectrum shaping of the output OFDM signal. After filtering, the filtered OFDM signal is sent to the framing and overlapping logic 606 to generate the OFDM symbols. The framing and overlapping logic 606 may be required to overlap the tail of consecutive symbols created by the filtering process.

Figure 7:
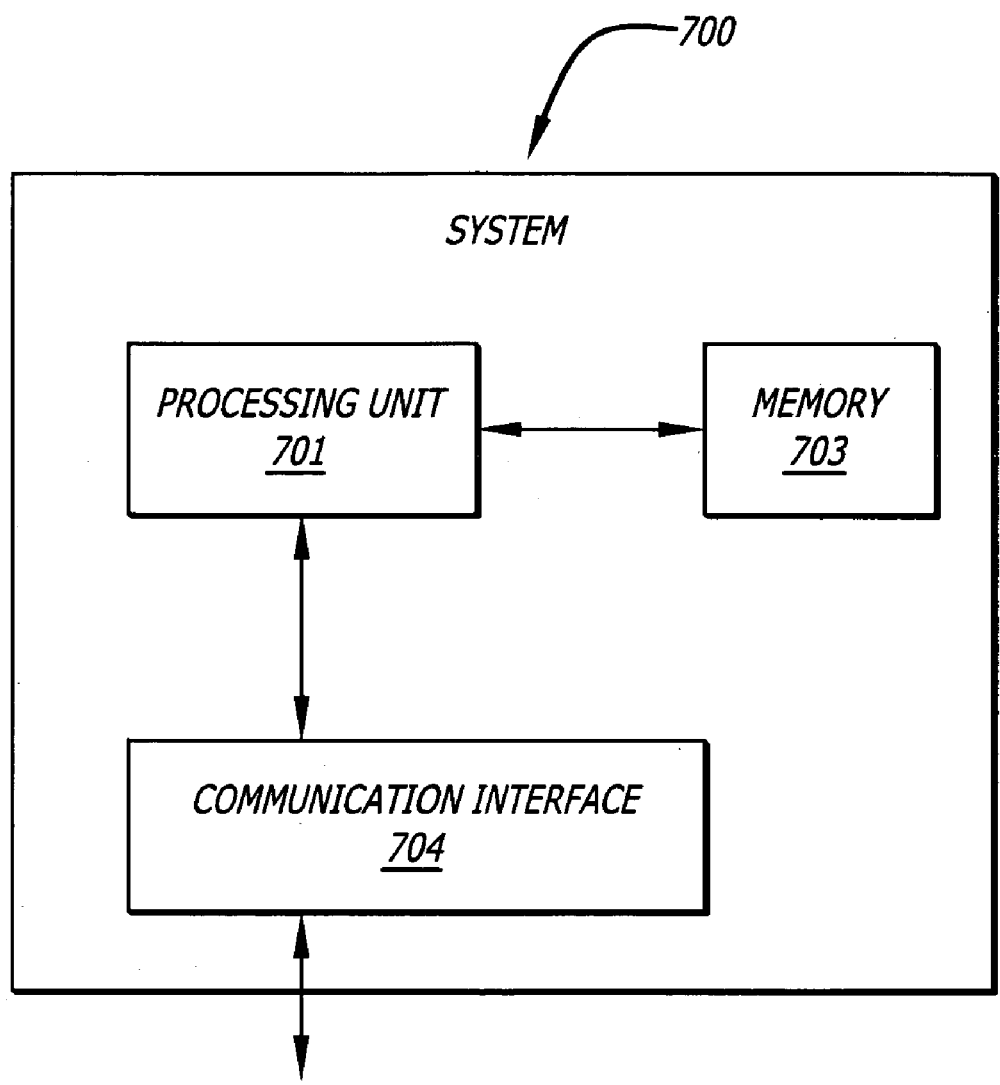
FIG. 7 illustrates a block diagram of an exemplary hardware implementation of the orthogonal frequency division multiplexing (OFDM) system in accordance with the invention.

FIG. 7 illustrates a block diagram of an exemplary hardware implementation of the orthogonal frequency division multiplexing (OFDM) system 700 in accordance with the invention. The OFDM systems 100 and 600 in accordance with the invention can be implemented with dedicated hardware or as software program running on a processor-based system. Such a processor-based system 700 comprises a processing unit 701, a memory 703, and a communications interface 704. The OFDM software program and data may reside in the memory 703. The processing unit 701 can access the software program and data stored in memory 703, and execute the program to generate the output OFDM signal with the desired spectrum. The output OFDM signal is then sent to a receiving device via the communications interface 704. The OFDM system 700 is merely an example. There are many ways that hardware can be configured to implement the OFDM spectrum shaping in accordance with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. An orthogonal frequency division multiplexing (OFDM) system for generating a modulated orthogonal multi-carrier signal, comprising:
    an over sampling logic to generate an MN over sampled data frame from an N sample data frame, wherein said MN over sampled data frame comprises M-1 zeros between consecutive samples;
    a wave shaping filter to perform convolution of said over sampled data frame with MN filter coefficients to produce an MN complex filtered sample frame in order to modify the frequency response of said modulated orthogonal multi-carrier signal in the frequency domain;
    a spectrum mask to modify said MN complex filtered sample frame respectively by MN elements to produce an MN complex filtered and masked sample frame in order to further modify the frequency response of said modulated orthogonal multi-carrier signal; and
    an inverse fast Fourier transform (IFFT) to generate said modulated orthogonal multi-carrier signal from said MN complex filtered and masked sample frame.

2. The OFDM system of claim 1, further comprising a modulation and framing logic to generate said N sample data frame by modulating a binary data frame.

3. The OFDM system of claim 2, wherein said modulation and framing logic performs phase shift keying (PSK) type modulation, coherent or differential.

4. The OFDM system of claim 2, wherein said modulation and framing logic performs amplitude shift keying (ASK) type modulation.

5. The OFDM system of claim 2, wherein said modulation and framing logic performs quadrature amplitude modulation (QAM).

6. The OFDM system of claim 1, further comprising a framing and overlapping logic to frame in time said modulated orthogonal multi-carrier signal and overlap in time consecutive frames of said modulated orthogonal multi-carrier signal.

7. The OFDM system of claim 1, further comprising a spectrum control input to receive information relating to a desired spectrum for said modulated orthogonal multi-carrier signal and to control said spectrum mask to produce said desired spectrum for said modulated orthogonal multi-carrier signal.

8. The OFDM system of claim 1, wherein the first value M and the second value N are integer values.

* * * * *